United States Patent [19]

Houlihan et al.

[11] 3,870,752

[45] Mar. 11, 1975

[54] ACYL SUBSTITUTED INDANE CARBOXYLIC ACIDS

[75] Inventors: William J. Houlihan, Mountain Lakes; Jeffrey Nadelson, Lake Parsipanny, both of N.J.

[73] Assignee: Sandoz-Wander, Inc., Hanover, N.J.

[22] Filed: Aug. 31, 1973

[21] Appl. No.: 393,475

[52] U.S. Cl........ 260/515 R, 260/475 SC, 260/592, 424/317
[51] Int. Cl............................................ C07c 65/20
[58] Field of Search ................................. 260/515 R

[56] References Cited
UNITED STATES PATENTS
3,644,479  2/1972  Juby et al. .......................... 260/469

OTHER PUBLICATIONS

Chem. Abstracts, Vol. 12, (1918), p. 144.

Askam et al., J. Chem. Soc., (1954), pp. 4691–4693.

*Primary Examiner*—James A. Patten
*Attorney, Agent, or Firm*—Gerald D. Sharkin; Robert S. Honor

[57]  ABSTRACT

Acyl substituted indane carboxylic acids, e.g., 5-pivaloyl-2-indan carboxylic acid, are prepared by hydrolyzing and decarboxylating a 5-pivaloylindan-2,2-dicarboxylic acid diethyl ester, and are useful as hypolipidemic agents.

3 Claims, No Drawings

ACYL SUBSTITUTED INDANE CARBOXYLIC ACIDS

This invention relates to acyl substituted indane carboxylic acids which exhibit hypolipidemic activity. In particular, it relates to alkanoyl substituted indane carboxylic acids, pharmaceutically acceptable salts, their preparation and intermediates thereof.

The compounds of this invention may be represented by the formula

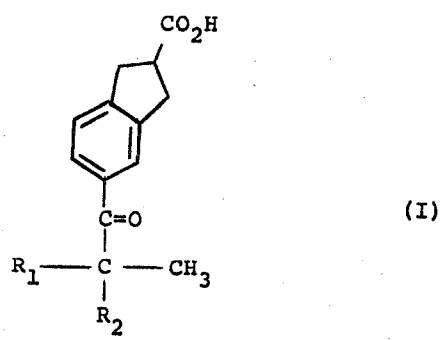

(I)

wherein $R_1$ and $R_2$ each independently represent alkyl having 1 to 2 carbon atoms, i.e., methyl or ethyl.

The compounds of formula (I) are prepared according to the following reaction scheme:

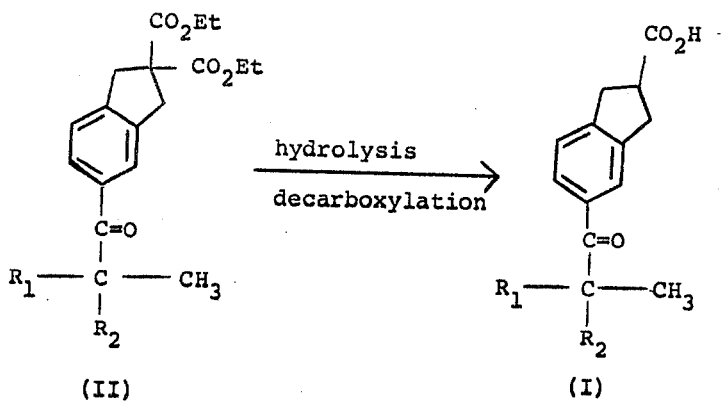

where $R_1$ and $R_2$ are as defined above.

The compounds of formula (I) are prepared by hydrolysing and decarboxylating a compound of the formula (II). The compounds of formula (II) are hydrolyzed employing conventional techniques e.g., with an alkali metal base such as sodium or potassium hydroxide, the latter being especially preferred, followed by acidification and spontaneous decarboxylation using an aqueous mineral acid in the presence of an aqueous solvent. Suitable acids which can be employed include strong mineral acids, such as hydrochloric acid, sulfuric acid and hydrobromic acid, preferably hydrochloric acid. The aqueous solvent can be water or a mixture of water and a water soluble organic solvent e.g., lower alkanols having 1 to 4 carbon atoms, e.g., methanol, ethanol and the like. The temperature of the reaction is not critical, but it is preferred that the reaction be carried out between about 60° to 180°C., preferably at the reflux temperature of the solvent. The reaction is run from about 12 to 36 hours, preferably about 18 to 22 hours. The product is recovered by conventional techniques, e.g. crystallization.

The compounds of formula (II), are prepared by the following reaction scheme:

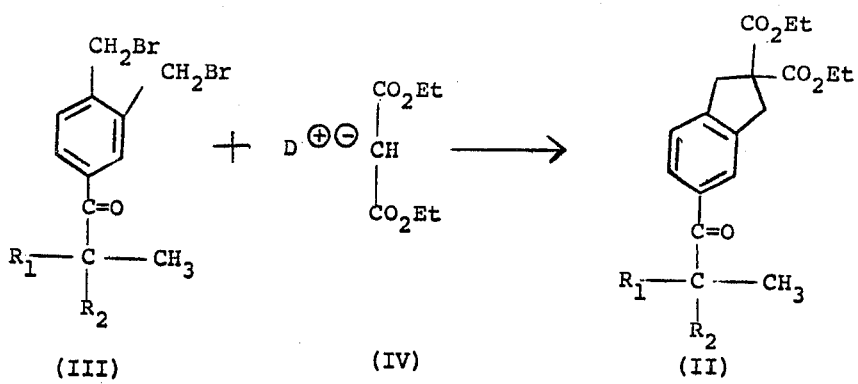

where D represents an alkali metal such as sodium or potassium, and $R_1$ and $R_2$ are as defined above.

The compounds of formula (II) are prepared by treating a compound of the formula (III) with a compound of the formula (IV) in the presence of a strong base such as sodium hydride, potassium hydride, potassium ethoxide or sodium ethoxide, the latter being especially preferred. The reaction is carried out in the presence of an inert organic solvent such as the lower alkanols, e.g., methanol, ethanol and the like, dimethylformamide or dimethylacetamide, preferably ethanol. The temperature of the reaction is not critical, but it is preferred that the reaction be run from about 20° to 30°C., preferably about 25°C. The reaction is run from about 12 to 24 hours, preferably about 16 to 20 hours. The product is recovered using conventional techniques, e.g. crystallization.

The compounds of formula (III) are prepared according to the following reaction scheme:

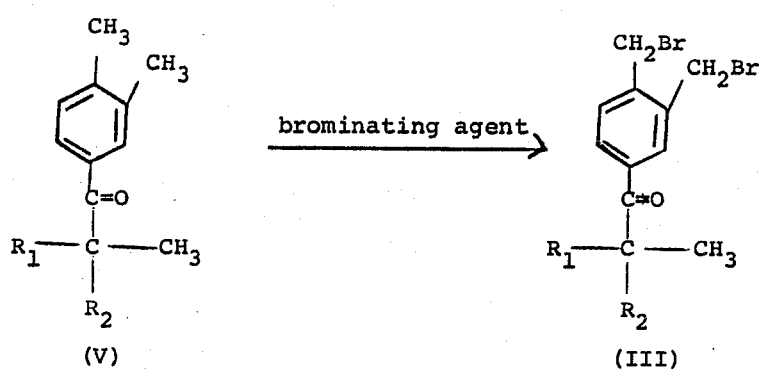

where $R_1$ and $R_2$ are as defined above.

The compounds of formula (III) are prepared by treating a compound of formula (V) with a brominating agent in the presence of an inert organic solvent and free radical initiator. The brominating agent which can be used is bromine, N-bromosuccinimide, N-bromophthalamide, N-bromoacetamide and the like. The particular agent used is not critical, but N-bromosuccinamide is preferred. In the preferred process, the free radical initiator used is an organic peroxide, especially benzoyl peroxide. The reaction can also be carried out under ultraviolet light. Although the particular solvent used is not critical, the preferred solvents are the halogenated hydrocarbons such as methylene dichloride, chloroform, carbon tetrachloride and the like, although the aromatic hydrocarbons such as benzene can also be employed. The temperature of the reaction is not critical, but reflux temperature of the solvent is preferred. The reaction is run for about 12 to 48 hours; preferably about 18 to 25 hours. The product is recovered by conventional techniques, e.g., crystallization.

Many of the compounds of formula (V) are known and may be prepared by methods described in the literature. The compounds of formula (V) not specifically disclosed may be prepared by analogous methods from known starting materials.

The compounds of formula (I) are useful because they possess pharmacological activity in animals as hypolipidemic agents, particularly as hyperlipoproteinemic agents as indicated by the fall of cholesterol and triglyceride levels in male albino Wistar rats weighing 110-130 g. initially. The rats are maintained on drug-free laboratory chow diets for seven days and then divided into groups of 8 to 10 animals. Each group with the exception of the control is then given orally 30 milligrams per kilogram of body weight per diem of the compound for six days. At the end of this period, the animals are anesthetized with sodium hexobarbital and bled from the carotid arteries. Serum or plasma samples are collected, and 1.0 ml. samples of the serum are added to 9.0 ml. redistilled isopropanol. Two autoanalyzer cupsful of a mixture of zeolite-copper hydroxide and Lloydds reagent (Kessler, E., and Lederer, H., 1965, Technicon Symposium Mediad Inc., New York, (345-347) are added, and the mixture is shaken for one hour. Cholesterol and triglyceride levels are determined simultaneously on the same sample by Technicon N24 A (cholesterol) and N-78 (triglyceride) methodology. The mean total serum cholesterol levels are then computed and the hypocholesterolemic activity is expressed as the fall in cholesterol levels as a a percentage of the control level. The change in serum triglyceride levels induced by the drug is computed as a percentage of the control triglyceride levels.

For such usage, the compounds (I) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixers and parenterally as solutions, suspensions, dispersions, emulsions and the like, e.g. a sterile injectable aqueous solution. The dosage will vary depending upon the mode of administration utilized and the particular compound employed.

The compounds of formula (I) may be similarly administered in the form of their non-toxic pharmaceutically acceptable salts. Such salts possess the same order of activity as the free base, and are readily prepared by reacting the base with an appropriate hydroxide or oxide and, accordingly, are included within the scope of this invention. Representative of such salts are the alkali metal salts, e.g., sodium, potassium and the like, the alkaline earth metal salts such as magnesium, calcium and the like.

The hypolipidemic effective dosage of compounds (I) employed in the alleviation of lipidemia may vary depending on the particular compound employed and the severity of the condition being treated. However, in general, satisfactory results are obtained when the compounds of formula (I) are administered at a daily dosage of from about 4.0 milligrams to about 250 milligrams per kilogram of animal body weight, preferably given in divided doses two to four times a day, or in sustained release form. For most large mammals, the total daily dosage is from about 300 milligrams to about 3000 milligrams. Dosage forms suitable for internal use comprise from about 75 to about 1500 milligrams of the active compound in intimate admixture with a solid or liquid pharmaceutically acceptable carrier or diluent.

A representative formulation suitable for oral administration 2 to 4 times a day for the treatment of lipidemia is a capsule prepared by standard encapsulating techniques which contains the following:

| Ingredients | Weight (mg) |
|---|---|
| 5-pivaloyl-2-indan carboxylic acid | 150 |
| insert solid diluent (starch, lactose, kaolin.) | 300 |

EXAMPLE 1

α,α'-dibromo-4-pivaloyl-o-xylene

To a suspension of 28.5 g. (1.17 g. atoms) magnesium turnings in 150 ml. tetrahydrofuran under a nitrogen atmosphere there is added 10 ml. of a solution of 2.6 g. (1.17 mole) 4-bromo-o-xylene in 650 ml. dry tetrahydrofuran, the reaction is started and the remainder of the bromoxylene is added dropwise at a rate that maintains a moderate reflux. After the addition is complete, the mixture is refluxed for an additional 1½ hours. The resulting grignard solution is added dropwise to a cold solution of 128.0 g. pivaloyl chloride (1.06 mole) in 500 ml. dry tetrahydrofuran at a rate that maintains the temperature at 0° to −5°C. The solution is stirred for an additional 1½ hours at 0° and then at room temperature for 18 hours. The mixture is then cooled to 0° and hydrolyzed by the addition of 100 ml. 2N hydrochloric acid. The layers are separated and 200 ml. of ether is added to the organic phases which is then washed respectively with 100 ml. 2N hydrochloride acid, 100 ml. 10 percent sodium bicarbonate solution and 100 ml. saturated sodium chloride. The resulting layer is dried over anhydrous sodium sulfate, filtered, and the solvent is removed vacuo to give 4-pivaloyl-o-xylene (b.p. 143°/12mm). A mixture of the resulting 4-pivaloyl-o-xylene is then added to 31.0 g. (1.77 mole) N-bromosuccinimide, 4.0 g. (0.016 mole) benzoyl peroxide and 1000 ml. of carbon tetrachloride and heated at reflux for 18 hours. The mixture is cooled and filtered and the resulting precipitate is washed with carbon tetrachloride. The solvent is removed in vacuo and the residue is crystallized from petroleum ether to give α, α'-dibromo-4-pivaloyl-o-xylene, m.p. 65°–68.5°C.

EXAMPLE 2

5-pivaloylindan-2,2-dicarboxylic acid diethyl ester

To a solution of 3.22 g. of sodium ethoxide in 80 ml. of dry ethanol, there is added dropwise 11.2 g. (0.07 mole) of diethyl malonate maintaining the temperature at 40°C. Stirring is initiated and there is then added dropwise 24.4 g. (0.07 mole) of α,α'-dibromo-4-pivaloyl-o-xylene in 120 ml. dry tetrahydrofuran while maintaining the temperature at 30°C. The resulting mixture is stirred at room temperature for 20 hours. Water is added and the excess ethanol is removed in vacuo, and the resulting residue partitioned between water and ether. The resulting layers are washed with water, and brine, decolorized with charcoal, dried over anhydrous magnesium sulfate, and evaporated. The residue is distilled at 180°–190°/0.5mm to give 5-pivaloylindan-2,2-dicarboxylic acid diethyl ester, m.p.

EXAMPLE 3

5-pivaloyl-2-indan carboxylic acid

A mixture of 20.1 g (0.06 mole) of 5-pivaloylindan-2,2-dicarboxylic acid diethyl ester, and 16.8 g (0.3 mole) of potassium hydroxide in 90 ml. of ethanol and 90 ml. of water is refluxed for 3 hours. The solvent is then evaporated in vacuo and the aqueous base solution is extracted with ether, decolorized, cooled to 0°C. and then acidified with 250 ml. of concentrated hydrochloric acid and refluxed for 18 hours. The resulting solution is cooled and extracted with ether. The ether is then washed with 2N sodium hydroxide and the basic water is decolorized, and made acidic at 0°C. with concentrated hydrochloric acid, extracted with ether, and the ether is then dried and evaporated. The resulting residue is recrystallized from pertroleum ether to give 5-pivaloyl-2-indan carboxylic acid, m.p. 111°–112.5°C.

The 5-pivaloyl-2-indan carboxylic acid of this example is an effective hypolipidemic agent when orally administered to an animal suffering from lipidemia at a dosage of 150 mg. four times per day.

What is claimed is:

1. A compound of the formula

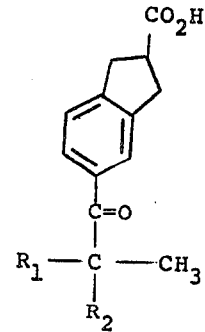

where $R_1$ and $R_2$ each independently represent alkyl having 1 to 2 carbon atoms, or a pharmaceutically acceptable salt thereof.

2. A compound of claim 1 in free acid form.

3. The compound of claim 2 which is 5-pivaloyl-2-indan carboxylic acid.

* * * * *